(12) United States Patent
Takeuchi

(10) Patent No.: US 9,716,967 B2
(45) Date of Patent: Jul. 25, 2017

(54) COMMUNICATION SYSTEM, COMMUNICATION TERMINAL APPARATUS, STORAGE MEDIUM HAVING STORED THEREIN COMMUNICATION PROGRAM, AND COMMUNICATION METHOD

(71) Applicant: NINTENDO CO., LTD., Kyoto (JP)

(72) Inventor: Hiroyuki Takeuchi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 99 days.

(21) Appl. No.: 14/300,850

(22) Filed: Jun. 10, 2014

(65) Prior Publication Data
US 2014/0378049 A1  Dec. 25, 2014

(30) Foreign Application Priority Data

Jun. 24, 2013  (JP) ................... 2013-131863

(51) Int. Cl.
| | |
|---|---|
| *H04B 5/00* | (2006.01) |
| *H04W 4/00* | (2009.01) |
| *H04W 4/02* | (2009.01) |

(52) U.S. Cl.
CPC ........... *H04W 4/008* (2013.01); *H04W 4/023* (2013.01)

(58) Field of Classification Search
CPC ............ G08B 13/2417; G08B 13/2448; H04N 1/00342; H04B 5/0037; H04B 5/0062; H04B 5/0075; H04M 1/7253; H04M 2250/04; H04M 2250/06; H04W 4/008; H03F 3/211; H03F 1/32; H03F 3/602; H03F 2200/451; H03F 3/38; H03F 1/565

USPC .................. 455/41.1, 41.2; 340/572.1, 10.51
See application file for complete search history.

(56) References Cited

U.S. PATENT DOCUMENTS

| | | | |
|---|---|---|---|
| 5,239,696 A * | 8/1993 | Balch ....................... | G01V 3/12 340/572.1 |
| 6,594,477 B1 * | 7/2003 | Kitaguchi .............. | H03D 7/161 334/1 |
| 7,426,373 B2 * | 9/2008 | Clingman ................ | H01Q 3/44 331/167 |
| 2005/0094183 A1 * | 5/2005 | Kojima .............. | H04N 1/00342 358/1.14 |
| 2006/0150223 A1 * | 7/2006 | Matsuo .................. | H01Q 25/00 725/81 |

(Continued)

FOREIGN PATENT DOCUMENTS

JP  2005-252613  9/2005

*Primary Examiner* — Edward Urban
*Assistant Examiner* — Max Mathew
(74) *Attorney, Agent, or Firm* — Nixon & Vanderhye PC

(57) ABSTRACT

A communication terminal apparatus includes an antenna controller and a target-side data transceiver. Before data communication is performed with an information processing apparatus via an antenna of the communication terminal apparatus, the antenna controller changes at least one of a resistive component of the antenna, voltage to be applied to the antenna, and current to be applied to the antenna, thereby changing a state of the antenna to cause a change in a magnetic field that results from the change in the state of the antenna and can be sensed by the information processing apparatus. After the antenna controller has changed the state of the antenna, the target-side data transceiver performs the data communication with the information processing apparatus.

17 Claims, 6 Drawing Sheets

(56) References Cited

U.S. PATENT DOCUMENTS

| | | | | |
|---|---|---|---|---|
| 2007/0004338 A1* | 1/2007 | Qi | ............... | H04B 1/1027 |
| | | | | 455/63.1 |
| 2008/0001721 A1* | 1/2008 | Tanaka | ............... | G06K 7/0008 |
| | | | | 340/10.31 |
| 2008/0067249 A1* | 3/2008 | Nakatsugawa | ............... | G06Q 20/32 |
| | | | | 235/451 |
| 2008/0094180 A1* | 4/2008 | Kato | ............... | G06K 19/0701 |
| | | | | 340/10.3 |
| 2010/0225482 A1* | 9/2010 | Kasai | ............... | G06K 19/0717 |
| | | | | 340/572.1 |
| 2011/0298593 A1* | 12/2011 | Sugiyama | ............... | G06K 7/10009 |
| | | | | 340/10.51 |
| 2012/0171952 A1* | 7/2012 | Ohira | ............... | H04M 1/72525 |
| | | | | 455/41.1 |
| 2014/0038517 A1* | 2/2014 | Asakura | ............... | H04W 4/008 |
| | | | | 455/41.1 |
| 2015/0254481 A1* | 9/2015 | Masuda | ............... | H04B 5/0062 |
| | | | | 340/10.51 |

* cited by examiner

COMMUNICATION SYSTEM, COMMUNICATION TERMINAL APPARATUS, STORAGE MEDIUM HAVING STORED THEREIN COMMUNICATION PROGRAM, AND COMMUNICATION METHOD

CROSS REFERENCE TO RELATED APPLICATION

The disclosure of Japanese Patent Application No. 2013-131863, filed on Jun. 24, 2013, is incorporated herein by reference.

FIELD

The technology shown here relates to a communication system, a communication terminal apparatus, and a communication method for performing near field communication, and a storage medium having stored therein a communication program for performing near field communication.

BACKGROUND AND SUMMARY

Conventionally, for example, there is a technique in which apparatuses communicate with each other using near field communication such as NFC (Near Field Communication). In near field communication, in accordance with the fact that a communication target has approached an initiator-side near field communication apparatus, the communication target is identified on the near field communication apparatus side, and communication is started. For example, in conventional near field communication, to detect whether or not a communication target has approached the range where communication can be performed, an initiator-side near field communication apparatus performs polling. Then, if the approach of a communication target to the range where communication can be performed has been detected, near field communication is performed between the initiator-side near field communication apparatus and the communication target.

When performing the above polling, the initiator-side near field communication apparatus may periodically send out a radio wave (a polling signal) for confirming the presence of a communication target. Then, if a communication target has approached the near field communication apparatus, an influence appears also in the near field communication apparatus by the coil inductive coupling between the near field communication apparatus and the communication target. Then, this influence is detected, thereby detecting the approach of the communication target. For example, the above influence appears as a result of changes in the amplitude and the phase of the antenna voltage of the near field communication apparatus side that are caused by a change in the impedance of the communication target by the sent polling signal.

The above influence is caused also when an object other than a communication target, such as metal or an antenna of another apparatus, has approached the initiator-side near field communication apparatus. Thus, after the approach of a communication target to the range where communication can be performed has been detected, if the initiator-side near field communication apparatus cannot start near field communication with the communication target, the initiator-side near field communication apparatus determines that the detected communication target is an object other than a target of near field communication. Then, the initiator-side near field communication apparatus performs control so that the communication target is not to be detected. For example, if the approach of an object other than the above target has been erroneously detected, the initiator-side near field communication apparatus excludes from detection targets an influence having appeared in the above detection (for example, excludes, from detection targets, changes in the amplitude and the phase of the antenna voltage that have appeared as the above influence), thereby preventing erroneous detection in the subsequent processing.

However, when a communication target is a device capable of turning on or off an NFC card emulator function, if the card emulator function has been turned on after the device had been brought into proximity to the initiator-side near field communication apparatus and the above erroneous detection prevention function had worked, the device may be excluded from communication targets.

Therefore, it is an object of an exemplary embodiment to provide a communication system, a communication terminal apparatus, and a communication method that are capable of avoiding the situation where communication becomes difficult in wireless communication performed by devices coming into proximity to each other, and a storage medium having stored therein a communication program capable of avoiding the situation where communication becomes difficult in wireless communication performed by devices coming into proximity to each other.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

An exemplary configuration of a communication system according to an exemplary embodiment is a communication system including an information processing apparatus and a communication terminal apparatus for performing wireless communication with the information processing apparatus while being in proximity to the information processing apparatus. The information processing apparatus includes a communication target sensor and an initiator-side data transceiver. The communication target sensor, via an antenna of the information processing apparatus, sends out a radio wave for confirming presence of a communication target near the antenna, and senses a change in a magnetic field caused by coil inductive coupling between the antenna and another antenna, thereby sensing the presence of the communication target. The initiator-side data transceiver, if the presence of the communication target has been confirmed near the antenna of the information processing apparatus, performs data communication with the communication target. The communication terminal apparatus includes an antenna controller and a target-side data transceiver. The antenna controller, before data communication is performed with the information processing apparatus via an antenna of the communication terminal apparatus, changes at least one of a resistive component of the antenna, voltage to be applied to the antenna, and current to be applied to the antenna, thereby changing a state of the antenna to cause a change in the magnetic field that results from the change in the state of the antenna and can be sensed by the communication target sensor. The target-side data transceiver, after the antenna controller has changed the state of the antenna, performs the data communication with the information processing apparatus.

Based on the above, even if a communication terminal apparatus has once been excluded from targets of the detection of a communication target performed by an information processing apparatus, it is possible to disable this exclusion setting by forcibly changing a magnetic field generated by the coil inductive coupling between an antenna of the information processing apparatus and an antenna of the communication terminal apparatus before data communication is performed. This can avoid the situation where wireless communication performed by devices coming into proximity to each other becomes difficult.

Further, in accordance with the fact that the communication terminal apparatus has started emulation that enables the wireless communication, the antenna controller may change the state of the antenna of the communication terminal apparatus.

Based on the above, in accordance with the fact that the emulation of the communication terminal apparatus has been started, the state of the antenna changes. This makes it possible to certainly perform wireless communication using this emulation function.

Further, the antenna controller may reduce the resistive component of the antenna of the communication terminal apparatus before the data communication is performed, thereby changing the state of the antenna of the communication terminal apparatus.

Based on the above, a resistive component of the antenna of the communication terminal apparatus is reduced before the data communication is performed. This makes it possible to easily change the magnetic field generated by the coil inductive coupling between the antenna of the information processing apparatus and the antenna of the communication terminal apparatus.

Further, after the data communication with the information processing apparatus has ended, the antenna controller may increase the resistive component of the antenna of the communication terminal apparatus.

Based on the above, the resistive component of the antenna is small during the data communication. This also makes it possible to perform stable data communication such that the load during the data communication process does not increase. Further, before the start of the next data communication, it is possible to bring the communication terminal apparatus into proximity to the information processing apparatus with the resistive component of the antenna being large.

Further, the antenna controller may temporarily reduce the resistive component of the antenna of the communication terminal apparatus.

Based on the above, the resistive component of the antenna of the communication terminal apparatus is temporarily reduced. This can avoid the situation where wireless communication becomes difficult.

Further, before the data communication is performed, the antenna controller may increase the resistive component of the antenna of the communication terminal apparatus, thereby changing the state of the antenna of the communication terminal apparatus.

Based on the above, a resistive component of the antenna of the communication terminal apparatus is increased before the data communication is performed. This makes it possible to easily change the magnetic field generated by the coil inductive coupling between the antenna of the information processing apparatus and the antenna of the communication terminal apparatus.

Further, if a response has been given by the information processing apparatus through the wireless communication after the resistive component had been increased, the antenna controller may reduce the resistive component of the antenna of the communication terminal apparatus.

Based on the above, the resistive component of the antenna is small during the data communication. This makes it also possible to perform stable data communication such that the load during the data communication process does not increase. Further, before the start of the next data communication, it is possible to bring the communication terminal apparatus into proximity to the information processing apparatus with the resistive component of the antenna being small.

Further, the antenna controller may temporarily increase the resistive component of the antenna of the communication terminal apparatus.

Based on the above, the resistive component of the antenna of the communication terminal apparatus is temporarily increased. This can avoid the situation where wireless communication becomes difficult.

Further, if a response has not been given by the communication target after the presence of the communication target had been confirmed near the antenna of the information processing apparatus, the initiator-side data transceiver may stop the data communication with the communication target. The communication target sensor may exclude, from subsequent sensing targets, a change in the magnetic field caused by the communication target with which the data communication has been stopped, thereby continuing a process of sensing presence of a new communication target.

Based on the above, if an object that is not a communication target of the information processing apparatus has come into proximity, it is possible to eliminate the object from communication targets and continue detecting a communication target.

Further, in accordance with whether or not a change in the magnetic field has been sensed in which an amount of change from a reference magnetic field strength is equal to or greater than a predetermined amount, the communication target sensor may sense the presence of the communication target present near the antenna of the information processing apparatus.

Based on the above, a change in the magnetic field is sensed, whereby it is possible to easily detect a communication target coming into proximity to the information processing apparatus.

Further, the exemplary embodiment may be carried out in the forms of a communication terminal apparatus that can be included in the above communication system, a storage medium having stored therein a communication program for causing a computer to execute at least some of the operations of the above components, a communication method including the operations of the above components, and the like.

According to the exemplary embodiment, even if a communication terminal apparatus has once been excluded from targets of the detection of a communication target performed by an information processing apparatus, it is possible to disable this exclusion setting by forcibly changing a magnetic field generated by the coil inductive coupling between an antenna of the information processing apparatus and an antenna of the communication terminal apparatus before data communication is performed. This can avoid the situation where wireless communication performed by devices coming into proximity to each other becomes difficult.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Figure 1:
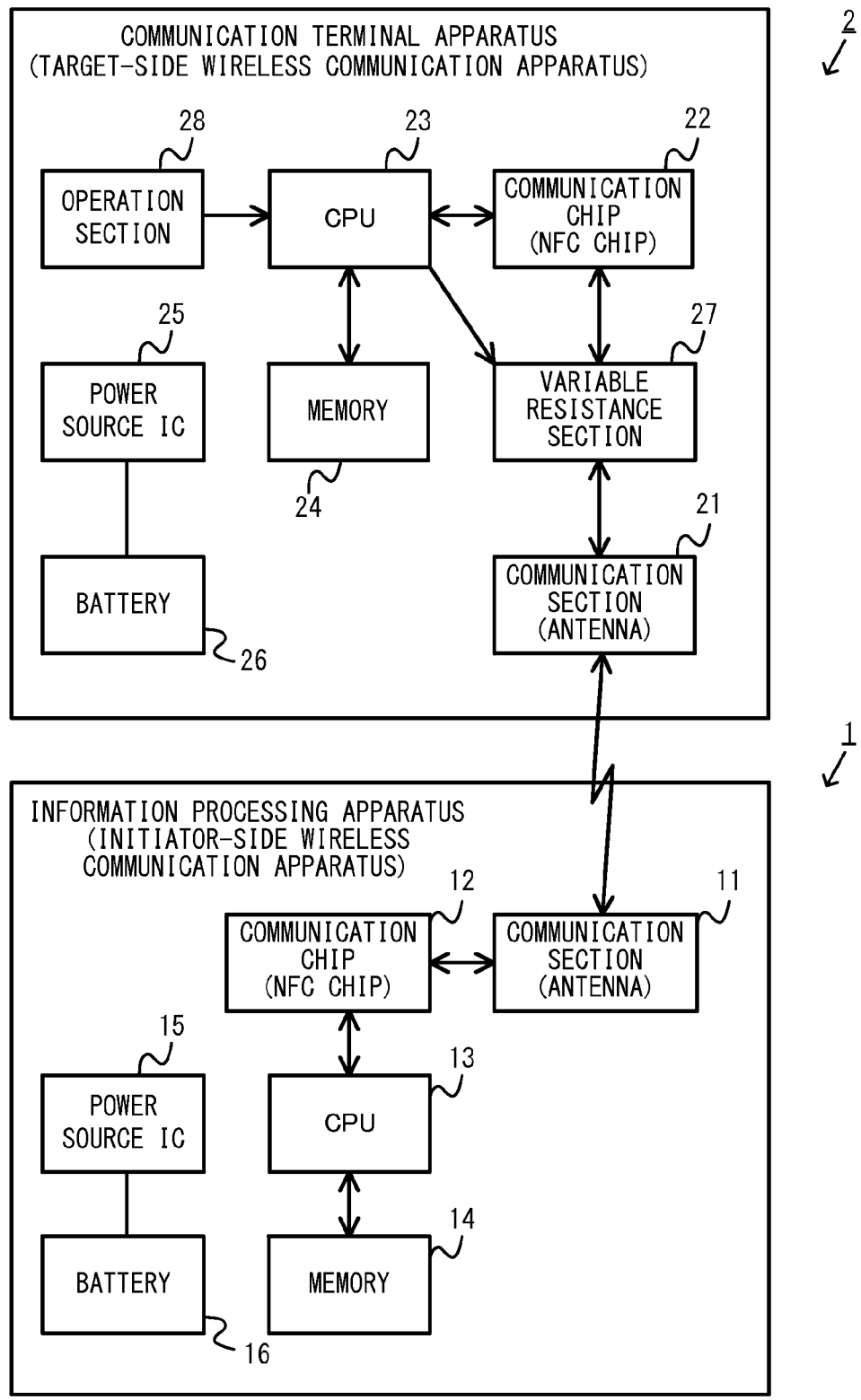
FIG. 1 is a diagram showing a non-limiting example of the configuration of a communication system.

A description is given below of a communication system, a communication terminal apparatus, a communication program, and a communication method according to an exemplary embodiment. First, the configuration of the communication system is described. FIG. 1 is a diagram showing an example of the configuration of the communication system according to the exemplary embodiment. As shown in FIG. 1, the communication system includes an information processing apparatus 1 and a communication terminal apparatus 2. The information processing apparatus 1 is any information processing apparatus that can perform wireless communication (hereinafter occasionally referred to simply as "near field communication") with the communication terminal apparatus 2 in proximity to the information processing apparatus 1 and function as an initiator-side wireless communication apparatus in the near field communication (an apparatus that mainly issues a command to a communication partner apparatus). Further, the communication terminal apparatus 2 is any information processing apparatus (for example, a handheld (or portable) apparatus such as a handheld game apparatus, a mobile phone, or a smartphone) that can perform near field communication with the information processing apparatus 1 and function as a wireless communication apparatus that serves as a target of the information processing apparatus 1 in the near field communication (an apparatus that mainly receives a command from an initiator-side wireless communication apparatus).

In the exemplary embodiment, a description is given taking as an example the case where, as an example of near field communication, communication based on the NFC standard is performed between the information processing apparatus 1 and the communication terminal apparatus 2. Here, the term "near field communication" as used herein refers to a communication method where radio waves from an apparatus develop an electromotive force (for example, by electromagnetic induction) in another apparatus. The other apparatus can operate by the developed electromotive force (the other apparatus may or may not have a power source). In near field communication, when the information processing apparatus 1 and the communication terminal apparatus 2 have come close to each other (typically, the distance between the information processing apparatus 1 and the communication terminal apparatus 2 has become dozen centimeters or less), the information processing apparatus 1 and the communication terminal apparatus 2 become capable of communicating with each other. Further, in near field communication, radio waves continue to be transmitted while the communication between two communication apparatuses is established (a communication target, which is another communication apparatus, is close to a communication apparatus). In the exemplary embodiment, the information processing apparatus 1 is a device having the function of an NFC reader/writer. Further, the communication terminal apparatus 2 is a device (a portable device) having an NFC card emulation function and functions as an NFC tag (for example, an active tag).

An example of the configuration of the information processing apparatus 1 is described below. As shown in FIG. 1, the information processing apparatus 1 includes a communication section 11. The communication section 11 is an antenna used for near field communication. Further, the information processing apparatus 1 includes a communication chip 12. In accordance with an instruction from a CPU 13 described later, the communication chip 12 generates a signal (a radio wave) to be sent from the communication section 11 and sends the generated signal from the communication section 11. The communication chip 12 is, for example, an NFC chip (an NFC integrated circuit). It should be noted that in another exemplary embodiment, a communication module (for example, an NFC module) having the functions of the communication section 11 and the communication chip 12 may be connected (attached) to the information processing apparatus 1. This communication module may be configured to be attachable to and detachable from the information processing apparatus 1.

Further, the information processing apparatus 1 includes the CPU 13 and a memory 14. The CPU 13 is an information processing section for performing various types of information processing to be performed by the information processing apparatus 1. The CPU 13 performs the various types of information processing using the memory 14. Further, the information processing apparatus 1 includes a battery 16 and a power source IC 15. The power source IC 15 supplies power from the battery 16 to the components of the information processing apparatus 1.

It should be noted that the information processing apparatus 1 may include a plurality of apparatuses. For example, in another exemplary embodiment, at least a part of information processing to be performed by the information processing apparatus 1 may be performed in a dispersed manner by a plurality of apparatuses capable of communicating with each other via a network (a wide-area network and/or a local network).

For example, the information processing apparatus 1 may be configured such that the CPU 13 can execute a plurality of programs such as an application program and a communication program. The application program is a program for executing any application for performing data communication with the communication terminal apparatus 2, and may be a game program for reading game data from the communication terminal apparatus 2 and performing game processing using the game data. The communication program is a program for performing near field communication with the communication terminal apparatus 2. For example, the communication program is firmware for causing the communication chip 12 to operate. The communication program receives an instruction from an application and causes the communication chip 12 to perform an operation for communication.

Next, an example of the configuration of the communication terminal apparatus 2 is described. As shown in FIG. 1, the communication terminal apparatus 2 includes a communication section 21. The communication section 21 is an antenna used for near field communication to be performed with an initiator-side wireless communication apparatus (the information processing apparatus 1). Further, the communication terminal apparatus 2 includes a communication chip 22 and a variable resistance section 27. In accordance with an instruction from a CPU 23 described later, the communication chip 22 generates a signal (a radio wave) to be sent from the communication section 21 and sends the generated signal from the communication section 21 via the variable resistance section 27. The communication chip 22 is, for example, an NFC chip (an NFC integrated circuit). In accordance with the control of the CPU 23, the variable resistance section 27 changes the resistive component of an antenna in the communication section 21. For example, the variable resistance section 27 includes a transistor that is turned on or off under the control of the CPU 23. The transistor is turned on or off, thereby increasing or decreasing the resistive component between the antenna and the communication chip 22 by a predetermined amount. It should be noted that the variable resistance section 27 may increase or decrease a predetermined amount of the resistive component in accordance with the control of the CPU 23, or may increase or decrease any resistive component between a minimum resistance value and a maximum resistance value. Further, in another exemplary embodiment, a communication module (for example, an NFC module) having the functions of the communication section 21, the communication chip 22, and the variable resistance section 27 may be connected (attached) to the communication terminal apparatus 2. This communication module may be configured to be attachable to and detachable from the communication terminal apparatus 2.

Further, the communication terminal apparatus 2 includes the CPU 23, a memory 24, and an operation section 28. The CPU 23 is an information processing section for performing various types of information processing to be performed by the communication terminal apparatus 2, and can perform the various types of information processing in accordance with an operation on the operation section 28. The CPU 23 performs the various types of information processing using the memory 24. As an example, if a user has performed the operation of enabling the card emulation function through the operation section 28, the CPU 23 executes various applications related to the card emulation function and causes the components of the communication terminal apparatus 2 to operate in a card emulation mode, thereby starting near field communication with the information processing apparatus 1. The operation section 28 is operation means to which the user of the communication terminal apparatus 2 inputs an operation and which outputs a signal indicating the operation input to the CPU 23. For example, the operation section 28 includes an input device such as an operation button and a touch panel. Further, the communication terminal apparatus 2 includes a battery 26 and a power source IC 25. The power source IC 25 supplies power from the battery 26 to the components of the communication terminal apparatus 2.

Figure 2:
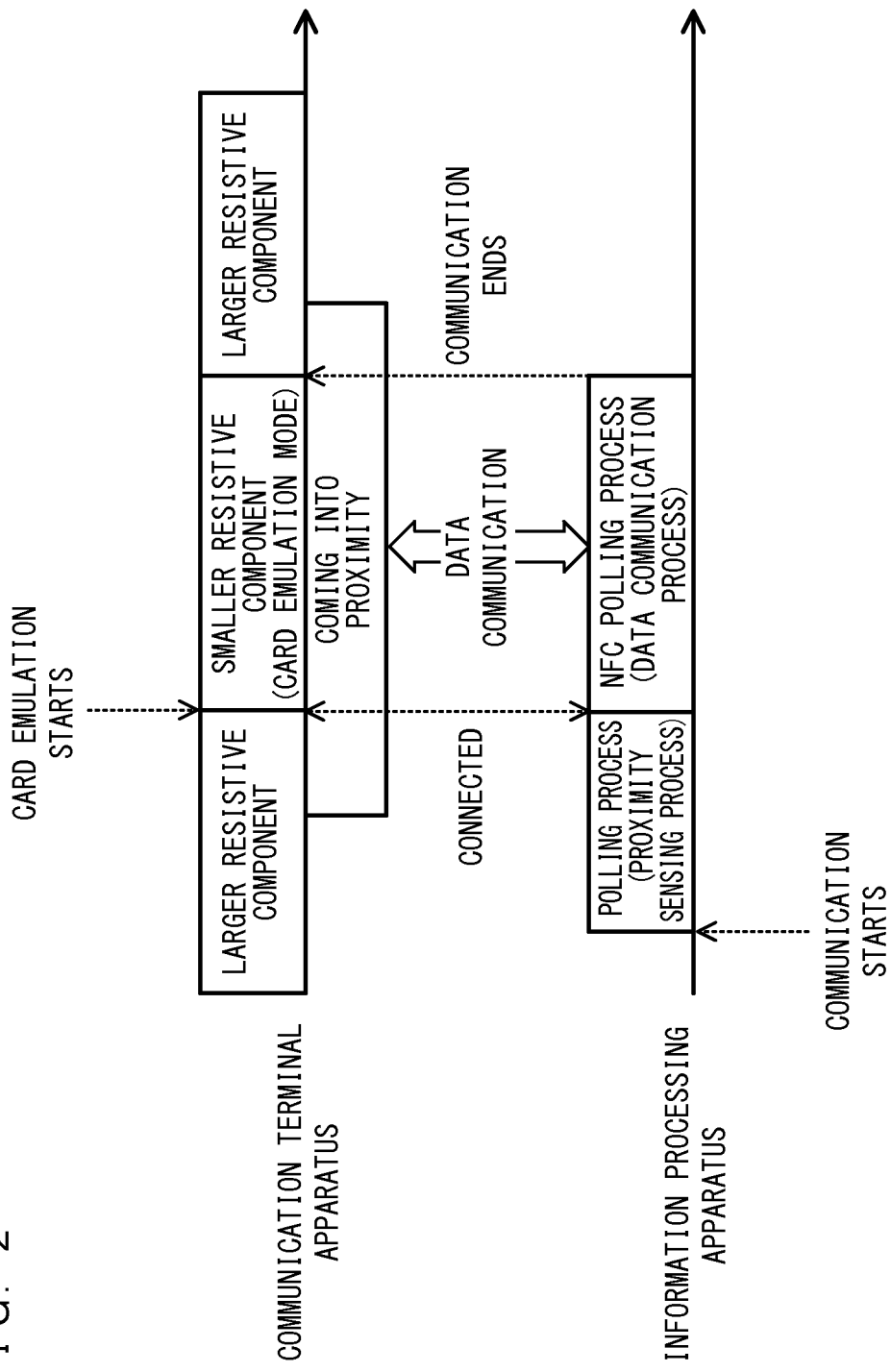
FIG. 2 is a diagram showing a non-limiting example of the operation of the communication system.
Figure 3:
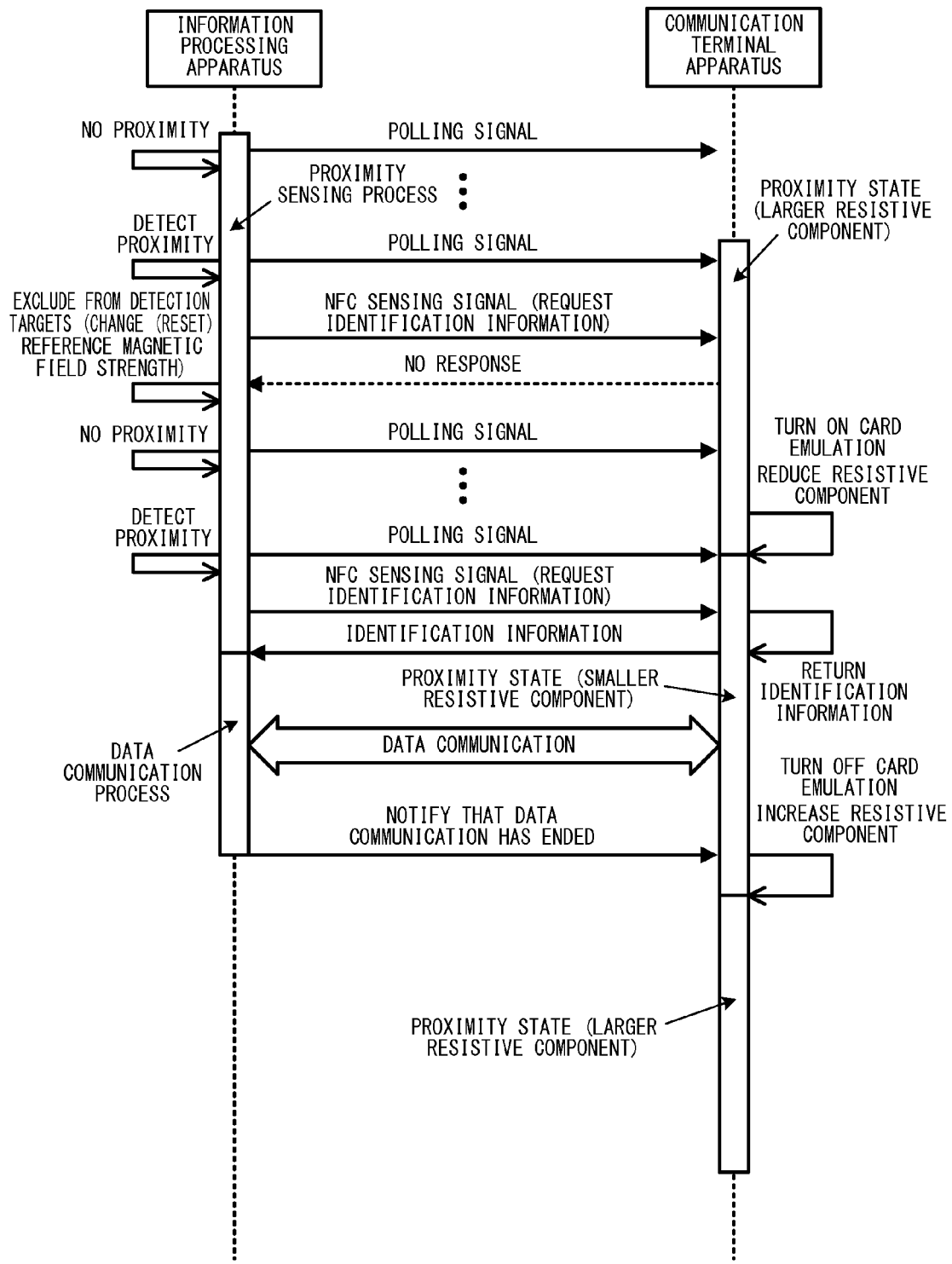
FIG. 3 is a chronological diagram showing a non-limiting example of the interaction between apparatuses in the communication system.
Figure 4:
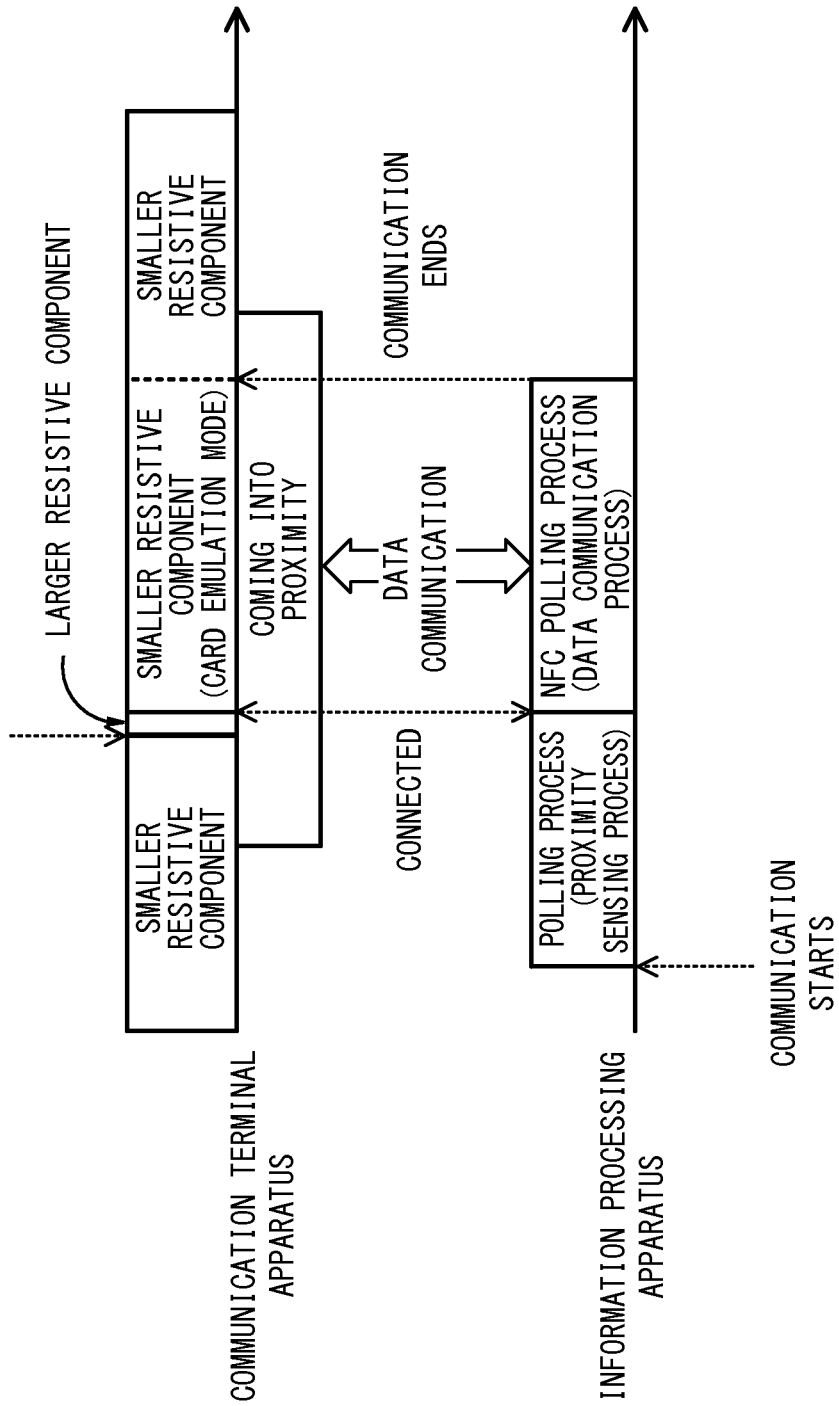
FIG. 4 is a diagram showing another non-limiting example of the operation of the communication system.

Next, with reference to FIGS. 2 to 4, an operation regarding communication in the communication system is described. FIG. 2 is a diagram showing an example of the operation of the communication system. FIG. 3 is a chronological diagram showing an example of the interaction between the apparatuses in the communication system. FIG. 4 is a diagram showing another example of the operation of the communication system.

As shown in FIG. 2, the information processing apparatus 1 first starts near field communication with the communication terminal apparatus 2. For example, in accordance with a user operation for reading and/or writing data between the information processing apparatus 1 and the communication terminal apparatus 2, the information processing apparatus 1 may start communication. Alternatively, in accordance with the execution of a predetermined application, the information processing apparatus 1 may start near field communication with the communication terminal apparatus 2.

When wireless communication is started, the information processing apparatus 1 starts a proximity sensing process (a communication target sensing process) for detecting the presence or absence of the communication terminal apparatus 2 present near the information processing apparatus 1 (more specifically, the communication section 11). For example, the information processing apparatus 1 performs a polling process. As an example, the information processing apparatus 1 sends out via the communication section 11 a radio wave (a polling signal (also referred to as a "polling command")) for confirming the presence of the communication terminal apparatus 2. Specifically, the information processing apparatus 1 on the initiator side periodically sends out a polling signal for confirming the presence of the communication terminal apparatus 2 as a target and detects an influence caused by the coil inductive coupling with the communication terminal apparatus 2 (changes in the amplitude and the phase of the antenna voltage of the communication section 11), thereby detecting the approach of the communication terminal apparatus 2. As an example, the information processing apparatus 1 on the initiator side sets a magnetic field strength that serves as a reference in a polling signal transmission state. If a change in the magnetic field has been sensed in which the amount of change from the reference magnetic field strength is equal to or greater than a predetermined amount, it is determined that the communication terminal apparatus 2 is present near the information processing apparatus 1. As a result of the polling process, if the communication terminal apparatus 2 present near the communication section 11 has not been sensed, the polling process is repeatedly performed.

If the communication terminal apparatus 2 has been placed in proximity to the communication section 11 by the user or the like, the communication terminal apparatus 2 is sensed by the polling process. However, even when the communication terminal apparatus 2 has been placed in proximity to the communication section 11, if the communication terminal apparatus 2 has not started the process of performing near field communication with the information processing apparatus 1 (specifically, the operation in the card emulation mode), near field communication (a connection) is not established between the information processing apparatus 1 and the communication terminal apparatus 2. Thus, the information processing apparatus 1 determines that the detected target is other than the communication terminal apparatus 2. Then, the information processing apparatus 1 performs control so that this target is not to be detected. For example, if the approach of an object other than the communication terminal apparatus 2 has been erroneously detected, the information processing apparatus 1 once excludes, from detection targets in the polling process, the changes in the amplitude and the phase of the antenna voltage that have appeared in the erroneous detection.

On the other hand, the communication terminal apparatus 2 is brought into proximity to the information processing apparatus 1 with the card emulation function turned off. It should be noted that the variable resistance section 27 of the communication terminal apparatus 2 is controlled to be in the state where the resistive component of the communication section 21 (the antenna) is increased by the predetermined amount (hereinafter referred to as a "larger antenna resistive component state"). Then, the communication terminal apparatus 2 approaching (coming into proximity to) the information processing apparatus 1 is detected in the larger antenna resistive component state by the polling process of the information processing apparatus 1; however, the card emulation function is in the off state. Thus, the communication terminal apparatus 2 is in the state of being once excluded from detection targets.

Next, the communication terminal apparatus 2 turns on the card emulation function while being in proximity to the information processing apparatus 1, and is controlled to be in the state where the resistive component of the communication section 21 in the variable resistance section 27 is reduced by the predetermined amount from the larger antenna resistive component state (as an example, the state where a resistance value to be added to the communication section 21 by the variable resistance section 27 is substantially 0, and hereinafter referred to as a "smaller antenna resistive component state"). This enables near field communication between the information processing apparatus 1 and the communication terminal apparatus 2; however, the communication terminal apparatus 2 is in the state of being excluded from detection targets in the polling process of the information processing apparatus 1. The communication terminal apparatus 2, however, has changed the resistive component (in this example, has reduced the resistive component) of the communication section 21 (the antenna) from when the communication terminal apparatus 2 had been excluded from detection targets in the polling process. Consequently, as an influence to be caused by the coil inductive coupling with the communication terminal apparatus 2 after the resistive component has been changed (changes in the amplitude and the phase of the antenna voltage of the communication section 11), an influence different from that before the change appears. Thus, the information processing apparatus 1 changes the resistive component, thereby determining that a communication target different from the excluded detection target has been newly detected. That is, the communication terminal apparatus 2 turns on the card emulation function while being in proximity to the information processing apparatus 1, and is changed to the smaller antenna resistive component state (as an example, by, as a result of changing to the smaller antenna resistive component state, giving the information processing apparatus 1 a change in which the amount of change from the reference magnetic field strength set by the information processing apparatus 1 is equal to or greater than the predetermined amount). Thus, the communication terminal apparatus 2 can establish near field communication (a connection) with the information processing apparatus 1.

If the communication terminal apparatus 2 has been newly sensed, the information processing apparatus 1 performs the process of establishing communication with the communication terminal apparatus 2 (for example, the process of acquiring information necessary for data communication from the communication terminal apparatus 2). Then, as shown in FIG. 2, the information processing apparatus 1 communicates with the communication terminal apparatus 2 via the communication section 11. Specifically, the information processing apparatus 1 performs a data communication process. For example, the data communication process is the process of transmitting and/or receiving data used in an application to be executed by the information processing apparatus 1 and/or the communication terminal apparatus 2, to and/or from the communication terminal apparatus 2. The data communication process is a communication process (an NFC polling process) different from the polling process and the process of establishing communication, and is, for example, the process of reading data, the process of writing data, or the like.

If the data communication process has ended, the information processing apparatus 1 sends the communication terminal apparatus 2 via the communication section 11 a radio wave indicating that the data communication process has ended. It should be noted that the radio wave indicating that the data communication process has ended may be similar to those (the polling signal) used in the above polling process. It should be noted that as another example, in accordance with the fact that the data communication process has ended, the information processing apparatus 1 may stop the transmission of a radio wave for near field communication. Further, as yet another example, the information processing apparatus 1 or the communication terminal apparatus 2 may depart from the communication allowance range of the near field communication that has been performed with the other (typically, the communication terminal apparatus 2 may move from the state of being in proximity to the information processing apparatus 1 to the state of being away from the information processing apparatus 1), whereby both apparatuses may detect that the data communication process has ended.

If the data communication process has ended, the communication terminal apparatus 2 turns off the card emulation function and is controlled to be in the larger antenna resistive component state. Thus, the communication terminal apparatus 2 enters the same state as that before the card emulation function has been turned on.

As described above, the antenna resistive component of the communication terminal apparatus 2 on the target side in near field communication is reduced when the card emulation function is turned on, whereby it is possible to disable the setting of the initiator-side communication apparatus (the information processing apparatus 1) that has once excluded the communication terminal apparatus 2 from detection targets. This can avoid the situation where wireless communication performed by devices coming into proximity to each other becomes difficult. Further, during the data communication process, the antenna resistive component of the communication terminal apparatus 2 on the target side is reduced, and therefore, the load during the data communication process does not increase. This also enables stable data communication.

Next, with reference to FIG. 3, the operation of the communication system according to the exemplary embodiment is described in detail. When starting wireless communication, the information processing apparatus 1 periodically sends out a polling signal via the communication section 11 to detect a communication target such as the communication terminal apparatus 2 present near the communication section 11 (the proximity sensing process). Then, if the presence of a communication target to be subjected to the coil inductive coupling with the polling signal cannot be confirmed, the information processing apparatus 1 determines that a communication target is not present near the communication section 11. Then, the information processing apparatus 1 performs the determination process every time the polling signal is sent out.

Then, if an influence of the coil inductive coupling with the sent polling signal (for example, changes in the amplitude and the phase of the antenna voltage of the communication section 11) has been detected, that is, if a change in the magnetic field has been sensed in which the amount of change from the reference magnetic field strength in the polling signal transmission state is equal to or greater than the predetermined amount (a change in the magnetic field that can be caused by the coil inductive coupling between the antenna of the communication section 11 and another antenna), the information processing apparatus 1 determines that a communication target is present near the communication section 11. Then, to start near field communication with the detected communication target, the information processing apparatus 1 sends the communication target an NFC sensing signal for requesting the identification information of the communication target.

On the other hand, the communication terminal apparatus 2 is in proximity to the communication section 11 with the card emulation function turned off in the larger antenna resistive component state. That is, the communication terminal apparatus 2 is not in the state of being able to perform near field communication with the information processing apparatus 1. Thus, even if the NFC sensing signal has been sent, the communication terminal apparatus 2 cannot transmit a response to the NFC sensing signal. Thus, the information processing apparatus 1 cannot receive a response to the NFC sensing signal, and therefore determines that the detected target is not a communication target (for example, the communication terminal apparatus 2). Then, in the proximity sensing process, the information processing apparatus 1 excludes, from subsequent detection targets, changes in the amplitude and the phase of the antenna voltage that have appeared in the detection. For example, among changes in the amplitude and the phase of the antenna voltage determined as the coil inductive coupling with another antenna, the information processing apparatus 1 determines, as a detection target in the subsequent proximity sensing process, changes greater (for example, changes greater by the predetermined amount) than the changes in the amplitude and the phase of the antenna voltage that have been detected when the communication terminal apparatus 2 has come into proximity to the communication section 11 with the card emulation function remaining turned off in the larger antenna resistive component state, and changes smaller (for example, changes smaller by the predetermined amount) than the changes in the amplitude and the phase of the antenna voltage detected when the communication terminal apparatus 2 has come into proximity to the communication section 11 with the card emulation function remaining turned off in the larger antenna resistive component state. Consequently, the communication terminal apparatus 2 in the larger antenna resistive component state is once excluded from detection targets in the proximity sensing process of the information processing apparatus 1. Then, the information processing apparatus 1 continues the proximity sensing process for periodically sending out a polling signal.

Next, in accordance with a user operation or the control of an application that is being executed, the card emulation function of the communication terminal apparatus 2 is turned on with the communication terminal apparatus 2 being in proximity to the information processing apparatus 1, and the communication terminal apparatus 2 starts the operation in the card emulation mode. Then, in accordance with the turning on of the card emulation function, the communication terminal apparatus 2 is controlled to be in the smaller antenna resistive component state. Consequently, in the information processing apparatus 1, an influence that appears by the coil inductive coupling with the sent polling signal changes. Specifically, in the proximity sensing process, the information processing apparatus 1 detects changes greater or smaller than the changes in the amplitude and the phase of the antenna voltage that have been detected with the communication terminal apparatus 2 in proximity to the information processing apparatus 1 in the larger antenna resistive component state. Thus, the information processing apparatus 1 can perform the proximity sensing process such that the communication terminal apparatus 2 in the smaller antenna resistive component state is a detection target. Thus, in the proximity sensing process, the information processing apparatus 1 determines that a new communication target is present near the communication section 11. Then, to start near field communication with the detected new communication target (that is, the communication terminal apparatus 2), the information processing apparatus 1 sends the communication target an NFC sensing signal for requesting the identification information of the communication target.

Having received the NFC sensing signal, the communication terminal apparatus 2 returns to the information processing apparatus 1 a signal indicating the information requested by the NFC sensing signal. For example, if, as the process of establishing communication, the information processing apparatus 1 has requested return of information necessary for data communication (for example, the identification information of the communication terminal apparatus 2), the communication terminal apparatus 2 sends the information processing apparatus 1 via the communication section 21 a signal indicating the identification information of the communication terminal apparatus 2.

The information processing apparatus 1 acquires the information necessary for data communication from the communication terminal apparatus 2 and then starts the data communication process for reading and writing data between the information processing apparatus 1 and the communication terminal apparatus 2. Then, if the data communication process has ended, the information processing apparatus 1 sends the communication terminal apparatus 2 via the communication section 11 a radio wave indicating that the data communication process has ended.

If the data communication has ended, the communication terminal apparatus 2 turns off the card emulation function and changes the antenna resistive component, and is controlled to be in the larger antenna resistive component state. Consequently, also when performing near field communication with the information processing apparatus 1 again, the communication terminal apparatus 2 can perform similar processing.

It should be noted that when the data communication process has ended, the communication terminal apparatus 2 may send the information processing apparatus 1 a radio wave indicating that the data communication process has ended. In this case, in accordance with the fact that the information processing apparatus 1 has received from the communication terminal apparatus 2 the signal indicating that the data communication process has ended, the information processing apparatus 1 stops the transmission of a radio wave for near field communication or starts the proximity sensing process for periodically sending out what is used in the above polling process (a polling signal).

Further, in the above example, in accordance with the turning on of the card emulation function, the communication terminal apparatus 2 reduces the antenna resistive component by the predetermined amount. Alternatively, the antenna resistive component may be changed in another direction. With reference to FIG. 4, another example of the operation of the communication system is described below.

Similarly to the example shown in FIG. 2, to start near field communication with the communication terminal apparatus 2, the information processing apparatus 1 first starts the proximity sensing process for detecting the presence or absence of the communication terminal apparatus 2 present near the information processing apparatus 1. Then, if the communication terminal apparatus 2 has been brought into proximity to the information processing apparatus 1 with the card emulation function turned off, the information processing apparatus 1 determines that the detected target is other than the communication terminal apparatus 2. Then, the information processing apparatus 1 performs control so that the target is not to be detected.

At this time, the communication terminal apparatus 2 is brought into proximity to the information processing apparatus 1 with the card emulation function turned off. The variable resistance section 27, however, is controlled so that the resistive component of the communication section 21 (the antenna) is in the smaller antenna resistive component state. Similarly, in this case, the communication terminal apparatus 2 approaching (coming into proximity to) the information processing apparatus 1 is detected in the smaller antenna resistive component state by the polling process of the information processing apparatus 1; however, the card emulation function is in the off state. Thus, the communication terminal apparatus 2 is in the state of being once excluded from detection targets.

Next, the communication terminal apparatus 2 turns on the card emulation function while being in proximity to the information processing apparatus 1, and is controlled to be in the larger antenna resistive component state. That is, the communication terminal apparatus 2 is excluded from detection targets in the polling process, and then changes the resistive component (in this example, increases the resistive component) of the communication section 21 (the antenna). Consequently, as an influence to be caused by the coil inductive coupling with the communication terminal apparatus 2 after the resistive component has been changed (changes in the amplitude and the phase of the antenna voltage of the communication section 11), an influence different from that before the change appears. Thus, even if the resistive component has been increased, the information processing apparatus 1 determines that a communication target different from the excluded detection target has been newly detected. Thus, the communication terminal apparatus 2 turns on the card emulation function while being in proximity to the information processing apparatus 1, and is changed to the larger antenna resistive component state. Thus, the communication terminal apparatus 2 can establish near field communication (a connection) with the information processing apparatus 1.

Then, after the process of establishing communication with the information processing apparatus 1 has been performed, the communication terminal apparatus 2 is controlled to be in the smaller antenna resistive component state before the data communication process is started. Then, the communication terminal apparatus 2 performs the data communication process with the information processing apparatus 1 in the smaller antenna resistive component state. As a first example, when starting the data communication process with the information processing apparatus 1 (for example, when having received activation for starting data communication), the communication terminal apparatus 2 is controlled to be in the smaller antenna resistive component state before the data communication process is started. As a second example, in accordance with the fact the communication terminal apparatus 2 has received from the information processing apparatus 1 a signal (for example, an NFC sensing signal) for acquiring information necessary for data communication from the communication terminal apparatus 2, the communication terminal apparatus 2 is controlled to be in the smaller antenna resistive component state. As a third example, in accordance with the fact that the communication terminal apparatus 2 has received a polling signal from the information processing apparatus 1 after having turned on the card emulation function, the communication terminal apparatus 2 is controlled to be in the smaller antenna resistive component state.

As described above, also if the antenna resistive component of the communication terminal apparatus 2 on the target side in near field communication has been increased when the card emulation function is turned on, it is possible to disable the setting of the initiator-side communication apparatus (the information processing apparatus 1) that has once excluded the communication terminal apparatus 2 from detection targets. This can avoid the situation where wireless communication performed by devices coming into proximity to each other becomes difficult. Further, in any of the first to third examples described above, during the data communication process with the information processing apparatus 1, the communication terminal apparatus is in the smaller antenna resistive component state, and therefore, the load during the data communication process does not increase. This enables stable data communication.

It should be noted that the above exemplary embodiment has used an example where in accordance with the turning on of the card emulation function, the antenna resistive component of the communication terminal apparatus 2 is changed. Alternatively, after the communication terminal apparatus 2 has been brought into proximity to the information processing apparatus 1 and before the card emulation function is turned on, the antenna resistive component of the communication terminal apparatus 2 may be changed. For example, it is also possible to obtain similar effects by enabling the operation of changing the antenna resistive component, aside from the operation of turning on the card emulation function, and then performing the operation of changing the antenna resistive component before the operation of the user turning on the card emulation function.

Further, the above exemplary embodiment has used an example where the antenna resistive component of the communication terminal apparatus 2 is changed, thereby avoiding the situation where wireless communication performed by devices coming into proximity to each other becomes difficult. Alternatively, any parameter may be changed so long as it is possible to change the state of the coil inductive coupling between the communication section 11 of the information processing apparatus 1 and the communication section 21 of the communication terminal apparatus 2. For example, when voltage or current is applied to the communication section 21 (the antenna), the voltage or the current is changed when the card emulation function is turned on. This can avoid the situation where the start of wireless communication becomes difficult by devices coming into proximity to each other before the card emulation function is turned on. As described above, in the exemplary embodiment, the antenna resistive component of the communication terminal apparatus 2, the voltage to be applied to the antenna, the current to be applied to the antenna, or the like may be changed. At least one of these parameters, however, may be changed, thereby changing the state of the coil inductive coupling between the communication section 11 of the information processing apparatus 1 and the communication section 21 of the communication terminal apparatus 2.

Figure 5:
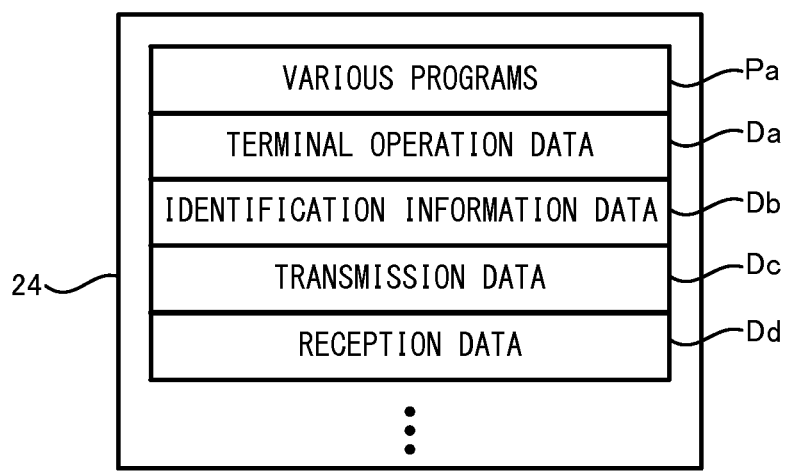
FIG. 5 is a diagram showing a non-limiting example of a data area set in a memory 24 of a communication terminal apparatus 2.
Figure 6:
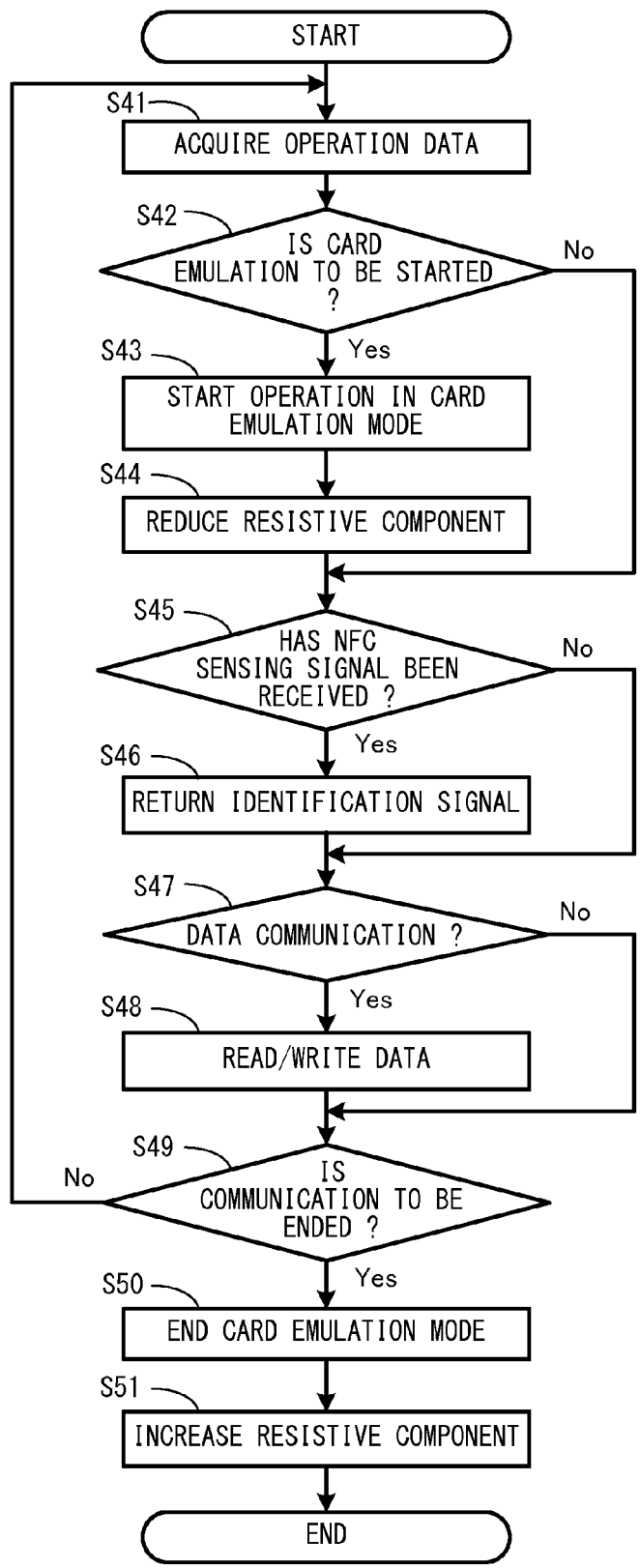
FIG. 6 is a flow chart showing a non-limiting example of a communication process to be performed by the communication terminal apparatus 2.

Next, with reference to FIGS. 5 and 6, a description is given of an example of the specific processing performed by the communication system (the communication terminal apparatus 2) in the exemplary embodiment. FIG. 5 is a diagram showing an example of a data area set in the memory 24 of the communication terminal apparatus 2 in the exemplary embodiment. It should be noted that the memory 24 stores, as well as data shown in FIG. 5, other types of data such as data of an image to be output to a display section (not shown) and an image used to generate the image to be output. The other types of data, however, are not described in detail.

In a program storage area of the memory 24, various programs Pa to be executed by the communication terminal apparatus 2 are stored. In the exemplary embodiment, as the various programs Pa, the communication program described above for performing near field communication, a program for operating in the card emulation mode, and the like are stored. It should be noted that the various programs Pa may be stored in advance in a storage device in the communication terminal apparatus 2, or may be acquired from a storage medium attachable to and detachable from the communication terminal apparatus 2 and stored in the memory 24, or may be acquired from another apparatus via a network such as the Internet and stored in the memory 24. The CPU 23 executes the various programs Pa stored in the memory 24.

Further, in a data storage area of the memory 24, various types of data used in the communication process and the information processing to be performed by the communication terminal apparatus 2 are stored. In the exemplary embodiment, the following are stored in the memory 24: terminal operation data Da; identification information data Db; transmission data Dc; reception data Dd; and the like. The terminal operation data Da is data output from the operation section 28 and is data representing the content of an operation on the operation section 28. The identification information data Db is data representing unique identification information used for card emulation. The transmission data Dc is data to be written to the information processing apparatus 1 in the data communication described above. The reception data Dd is data read from the information processing apparatus 1 in the data communication described above.

Next, the detailed flow of the communication process in the exemplary embodiment is described. FIG. 6 is a flow chart showing an example of the communication process to be performed by the communication terminal apparatus 2 in the exemplary embodiment. In the exemplary embodiment, a series of processes shown in FIG. 6 are performed by the CPU 23 executing the communication program included in the various programs Pa. It should be noted that the communication process shown in FIG. 6 may be started at any timing. Further, in FIG. 6, all the steps performed by the CPU 23 are abbreviated as "S".

It should be noted that the processes of all the steps in the flow chart shown in FIG. 6 are merely illustrative. Thus, the processing order of the steps may be changed, or another process may be performed in addition to (or instead of) the processes of all the steps, so long as similar results are obtained. Further, in the present exemplary embodiment, a description is given on the assumption that the CPU 23 performs the processes of all the steps in the flow chart. Alternatively, a processor or a dedicated circuit other than the CPU may perform the processes of some of the steps in the flow chart.

In FIG. 6, the CPU 23 acquires operation data from the operation section 28 and updates the terminal operation data Da (step 41), and the processing proceeds to the next step.

Next, in accordance with the operation data acquired in the above step 41, the CPU 23 determines whether or not card emulation is to be started (step 42). For example, if the operation of turning on the card emulation function has been performed through the operation section 28, the CPU 23 determines that card emulation is to be started. Then, if card emulation is to be started, the processing proceeds to step 43. If, on the other hand, card emulation is not to be started (including the case where card emulation has already been started), the processing proceeds to step 45.

In step 43, the CPU 23 causes the components of the communication terminal apparatus 2 to operate in the card emulation mode, and the processing proceeds to the next step.

Next, the CPU 23 performs control to reduce the resistive component of the communication section 21 (the antenna) by the predetermined amount (step 44), and the processing proceeds to step 45. For example, before the card emulation is started, the variable resistance section 27 is controlled so that the resistive component between the communication section 21 and the communication chip 22 is increased by the predetermined amount. The CPU 23 turns on or off the transistor of the variable resistance section 27, thereby performing control to reduce the resistive component between the communication section 21 and the communication chip 22 by the predetermined amount (for example, so that a resistance value to be added to the communication section 21 by the variable resistance section 27 is substantially 0).

In step 45, the CPU 23 determines whether or not an NFC sensing signal (a signal for requesting return of information (identification information) necessary to establish data communication) has been received from the initiator-side communication apparatus (the information processing apparatus 1 here). Then, if an NFC sensing signal has been received, the processing proceeds to step 46. If, on the other hand, an NFC sensing signal has not been received, the processing proceeds to step 47.

In step 46, the CPU 23 returns via the communication section 21 a signal indicating the information requested by the information processing apparatus 1, and the processing proceeds to step 47.

In step 47, the CPU 23 determines whether or not the data communication process is to be performed with the information processing apparatus 1. Then, if the data communication process is to be performed, the processing proceeds to step 48. If, on the other hand, the data communication process is not to be performed, the processing proceeds to step 49.

In step 48, the CPU 23 performs the data communication process with the information processing apparatus 1, and the processing proceeds to step 49. For example, if the transmission of data has been requested by the information processing apparatus 1 in the data communication process, the CPU 23 reads the requested data from the transmission data Dc and transmits the data to the information processing apparatus 1 via the communication section 21. Further, if data has been transmitted from the information processing apparatus 1 in the data communication process, the CPU 23 writes the transmitted data to the reception data Dd.

In step 49, the CPU 23 determines whether or not the near field communication that is being performed with the information processing apparatus 1 is to be ended. For example, if a signal indicating that the data communication process that has been performed up to the present time is to be ended has been received from the information processing apparatus 1, or if the transmission of a radio wave from the information processing apparatus 1 has been stopped, or if the control for turning off the card emulation function is performed by the program that is being executed, or if the user has performed the operation of ending the near field communication or the data communication process, or the like, the CPU 23 determines that the data communication process is to be ended. If the near field communication is to be ended, the processing proceeds to step 50. If, on the other hand, the near field communication is to be continued, or if the near field communication has not yet been started, the processing returns to the above step 41, and the process thereof is repeated.

In step 50, the CPU 23 ends the operation in the card emulation mode that is being performed by the components of the communication terminal apparatus 2, and the processing proceeds to the next step.

Next, the CPU 23 performs control to increase the resistive component of the communication section 21 (the antenna) by the predetermined amount (step 51), and the processing of the flow chart ends. For example, the CPU 23 turns on or off the transistor of the variable resistance section 27, thereby performing control to increase the resistive component between the communication section 21 and the communication chip 22 by the predetermined amount.

As described above, according to the series of processes shown in FIG. 6 described above, the processes of steps 41 to 49 are sequentially and repeatedly performed, and steps 50 and 51 are performed when the near field communication is ended. By such a series of processes, the antenna resistive component of the communication terminal apparatus 2 on the target side in near field communication changes when the card emulation function is turned on. Thus, even if the communication terminal apparatus 2 has once been excluded from detection targets, it is possible to immediately start data communication with the information processing apparatus 1.

It should be noted that the above exemplary embodiment has used, as an example, near field communication (proximity-type contactless communication) for bringing the information processing apparatus 1 and the communication terminal apparatus 2 into proximity to each other to perform wireless communication based on the NFC standard. Alternatively, the exemplary embodiment may be applied to a communication system where near field communication is performed based on other standards. For example, the exemplary embodiment can be applied also to a communication system for performing wireless communication at a communication distance classified into a vicinity type, a remote type, a short distance type, or the like as well as the proximity type in contactless near field communication. Further, each of the information processing apparatus 1 and the communication terminal apparatus 2 may be any apparatus. For example, each of the information processing apparatus 1 and the communication terminal apparatus 2 may be a stationary game apparatus, a handheld game apparatus, a general personal computer, any handheld electronic device (a PDA (Personal Digital Assistant), a mobile phone, a personal computer, a camera, or the like), or the like, or may be a communication system for performing wireless communication by the combination of a vehicle and an electronic key.

It should be noted that the above descriptions are given using the example where the information processing apparatus 1 and the communication terminal apparatus 2 each perform a communication process. Alternatively, another apparatus may perform at least some of the processing steps. For example, if the communication terminal apparatus 2 is further configured to communicate with another apparatus (for example, another server, another image display apparatus, another game apparatus, or another mobile terminal), the other apparatus may cooperate to perform the processing steps. Another apparatus may thus perform at least some of the processing steps, which enables a process similar to that described above. Further, the communication process described above can be performed by a processor or the cooperation of a plurality of processors, the processor or the plurality of processors contained in an information processing system including at least one information processing apparatus. Further, in the exemplary embodiment, the communication process can be performed by each of the CPU 13 of the information processing apparatus 1 and the CPU 23 of the communication terminal apparatus 2 executing a predetermined game program. Alternatively, a part or all of the process may be performed by dedicated circuits included in the information processing apparatus 1 and/or the communication terminal apparatus 2.

Here, the above variations make it possible to achieve the exemplary embodiment also by a system form such as cloud computing, or a system form such as a distributed wide area network or a local area network. For example, in a system form such as a distributed local area network, it is possible to execute the above processing between a stationary information processing apparatus (a stationary game apparatus) and a handheld information processing apparatus (a handheld game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

In addition, the processing orders, the setting values, the conditions used in the determinations, and the like that are used in the information processing described above are merely illustrative. Thus, it goes without saying that the exemplary embodiment can be achieved also with other orders, other values, and other conditions.

In addition, the above programs may be supplied to an apparatus for performing image processing or the image display apparatus 3 not only through an external storage medium such as the external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment can be used as, for example, a communication system, a communication terminal apparatus, a communication program, a communication method, and the like in order, for example, to avoid the situation where wireless communication performed by devices coming into proximity to each other becomes difficult.

What is claimed is:

1. A communication system including an information processing apparatus and a communication terminal apparatus for performing wireless communication with the information processing apparatus while being in proximity to the information processing apparatus, the information processing apparatus comprising:
   a communication target sensor configured to, via an antenna of the information processing apparatus, send out a radio wave for confirming presence of a communication target near the antenna of the information processing apparatus, and sense a change in a magnetic field caused by coil inductive coupling between the antenna of the information processing apparatus and another antenna, thereby sensing the presence of the communication target; and
   an initiator-side data transceiver configured to, if the presence of the communication target has been confirmed near the antenna of the information processing apparatus, perform data communication with the communication target, the communication terminal apparatus comprising:
   an antenna controller configured to, at a point in time before data communication is started with the information processing apparatus via an antenna of the communication terminal apparatus and in response to a user operation or user control of an application, temporarily change a state of the antenna of the communication terminal apparatus by changing at least one of a resistive component of the antenna of the communication terminal apparatus, voltage to be applied to the antenna of the communication terminal apparatus, and current to be applied to the antenna of the communication terminal apparatus, wherein changing the state of the antenna of the communication terminal apparatus causes a change in the magnetic field of the antenna of the communication terminal apparatus that can be sensed by the communication target sensor; and
   a target-side data transceiver configured to, after the antenna controller has changed the state of the antenna of the communication terminal apparatus, perform the data communication with the information processing apparatus.

2. The communication system according to claim 1, wherein
   when the communication terminal apparatus has started card emulation that enables the wireless communication, the antenna controller changes the state of the antenna of the communication terminal apparatus.

3. The communication system according to claim 1, wherein
   the antenna controller reduces the resistive component of the antenna of the communication terminal apparatus before the data communication is performed, thereby changing the state of the antenna of the communication terminal apparatus.

4. The communication system according to claim 3, wherein
   after the data communication with the information processing apparatus has ended, the antenna controller increases the resistive component of the antenna of the communication terminal apparatus.

5. The communication system according to claim 3, wherein
   the antenna controller temporarily reduces the resistive component of the antenna of the communication terminal apparatus.

6. The communication system according to claim 1, wherein
   before the data communication is performed, the antenna controller increases the resistive component of the antenna of the communication terminal apparatus, thereby changing the state of the antenna of the communication terminal apparatus.

7. The communication system according to claim 6, wherein
   if a response has been given by the information processing apparatus through the wireless communication after the resistive component had been increased, the antenna controller reduces the resistive component of the antenna of the communication terminal apparatus.

8. The communication system according to claim 6, wherein
   the antenna controller temporarily increases the resistive component of the antenna of the communication terminal apparatus.

9. The communication system according to claim 1, wherein
   if a response has not been given by the communication target after the presence of the communication target had been confirmed near the antenna of the information processing apparatus, the initiator-side data transceiver stops the data communication with the communication target, and
   the communication target sensor excludes, from subsequent sensing targets, a change in the magnetic field caused by the communication target with which the data communication has been stopped, thereby continuing a process of sensing presence of a new communication target.

10. The communication system according to claim 1, wherein
in accordance with whether or not a change in the magnetic field has been sensed in which an amount of change from a reference magnetic field strength is equal to or greater than a predetermined amount, the communication target sensor senses the presence of the communication target present near the antenna of the information processing apparatus.

11. A communication terminal apparatus for performing wireless communication with another apparatus while being in proximity to the other apparatus, the communication terminal apparatus comprising:
an antenna controller configured to, at a point in time before data communication is started with the other apparatus via an antenna of the communication terminal apparatus and in response to a user operation or user control of an application, temporarily change a state of the antenna by changing at least one of a resistive component of the antenna, voltage to be applied to the antenna, and current to be applied to the antenna, wherein changing the state of the antenna causes a change in the magnetic field of the antenna that can be sensed by the other apparatus; and
a data transceiver configured to, after the antenna controller has changed the state of the antenna, perform the data communication with the other apparatus.

12. A non-transitory computer-readable storage medium having stored therein a communication program to be executed by a computer included in a communication terminal apparatus for performing wireless communication with another apparatus while being in proximity to the other apparatus, the communication program, when executed, causes the computer to execute:
at a point in time before data communication is started with the other apparatus via an antenna of the communication terminal apparatus and in response to a user operation or user control of an application, temporarily changing a state of the antenna by changing at least one of a resistive component of the antenna, voltage to be applied to the antenna, and current to be applied to the antenna, wherein changing the state of the antenna causes a change in the magnetic field of the antenna that can be sensed by the other apparatus; and
after the state of the antenna has been changed, performing the data communication with the other apparatus.

13. A communication method to be executed by a processor or a cooperation of a plurality of processors, the processor or the plurality of processors contained in a system including an information processing apparatus and a communication terminal apparatus for performing wireless communication with the information processing apparatus while being in proximity to the information processing apparatus, the communication method comprising:
via an antenna of the information processing apparatus, sending out a radio wave for confirming presence of a communication target near the antenna of the information processing apparatus, and sensing a change in a magnetic field caused by coil inductive coupling between the antenna of the information processing apparatus and another antenna, thereby sensing the presence of the communication target;
if the presence of the communication target has been confirmed near the antenna of the information processing apparatus, performing, on an initiator side, data communication with the communication target;
at a point in time before data communication is started with the information processing apparatus via an antenna of the communication terminal apparatus and in response to a user operation or user control of an application, temporarily change a state of the antenna of the communication terminal apparatus by changing at least one of a resistive component of the antenna of the communication terminal apparatus, voltage to be applied to the antenna of the communication terminal apparatus, and current to be applied to the antenna of the communication terminal apparatus, wherein changing the state of the antenna of the communication terminal apparatus causes a change in the magnetic field of the antenna of the communication terminal apparatus that can be sensed by sensing the presence of the communication target; and
after the state of the antenna of the communication terminal apparatus has been changed, performing, on a target side, the data communication with the information processing apparatus.

14. The communication terminal apparatus of claim 11, wherein the antenna controller is configured to, after receiving a signal from the other apparatus indicating that the data communication is stopped with the other apparatus, return the state of the antenna to the state of the antenna before data communication was started.

15. A communication terminal apparatus for performing wireless communication with another apparatus, the communication terminal apparatus comprising:
an antenna; and
a processing system including at least one processor, the processing system being configured to:
detect a polling signal transmitted by another apparatus for detecting presence of the communication terminal apparatus;
after detecting the polling signal and before near field data communication is performed with the another apparatus via the antenna, change a state of the antenna by changing at least one of a resistive component of the antenna, voltage to be applied to the antenna, and current to be applied to the antenna, wherein changing the state of the antenna causes a change in the magnetic field of the antenna that can be sensed by the another apparatus;
maintain the changed state of the antenna of the communication terminal apparatus while performing the near field data communication with the another apparatus via the antenna; and
after the near field data communication with the another apparatus has ended, return the state of the antenna to the state of antenna before the near field data communication was started with the another apparatus.

16. The communication terminal apparatus of claim 15, wherein the processing system is further configured to:
start card emulation to enable the communication terminal apparatus to perform the near field communication with the another apparatus; and
after the near field data communication with the another apparatus has ended, stop the card emulation.

17. The communication terminal apparatus of claim 16, wherein the state of the antenna is changed after detecting the polling signal and before the card emulation is started.

* * * * *